United States Patent [19]

Höhl et al.

[11] Patent Number: 5,062,889

[45] Date of Patent: Nov. 5, 1991

[54] PROCESS FOR THE PREPARATION OF HYDROCOLLOID MIXTURES HAVING IMPROVED DISPERSIBILITY

[75] Inventors: Frank Höhl, Neuenkirchen; Jörn Breckwoldt, Rothenburg, both of Fed. Rep. of Germany

[73] Assignee: Wolff Walsrode AG, Walsrode, Fed. Rep. of Germany

[21] Appl. No.: 546,459

[22] Filed: Jun. 29, 1990

[30] Foreign Application Priority Data

Jul. 13, 1989 [DE] Fed. Rep. of Germany ....... 3923144

[51] Int. Cl.$^5$ ............................................. C09D 101/28
[52] U.S. Cl. ................................ 106/197.2; 106/197.1
[58] Field of Search ........................... 106/197.1, 197.2

[56] References Cited

U.S. PATENT DOCUMENTS

| 2,425,768 | 5/1947 | Wagner | 106/197.1 |
| 3,769,247 | 10/1973 | Glomski et al. | 106/197.1 |
| 4,373,959 | 2/1983 | Socha | 106/197.1 |

FOREIGN PATENT DOCUMENTS 1193650  3/1970  United Kingdom .

*Primary Examiner*—Aaron Weisstuch
*Assistant Examiner*—David M. Brunsman
*Attorney, Agent, or Firm*—Sprung, Horn, Kramer & Woods

[57] ABSTRACT

Hydrocolloid mixtures having improved dispersibility in water from an uncross-linked and a cross-linked hydrocolloid are prepared by subjecting at least one of the hydrocolloids to the action of at least one swelling agent or solvent for the hydrocolloid in a mixing apparatus before dispersion and vigorously mixing it therewith.

8 Claims, No Drawings

PROCESS FOR THE PREPARATION OF HYDROCOLLOID MIXTURES HAVING IMPROVED DISPERSIBILITY

This invention relates to a process for the preparation of hydrocolloid mixtures and improved hydrocolloid mixtures.

Many water-soluble cellulose derivatives tend to form lumps when attempts are made to dissolve them in water, especially if they are in a fine pulverulent form. Such substances must therefore be dissolved slowly with continuous vigorous stirring or they must first be thoroughly moistened. These measures are very time consuming and in many cases are not technically possible.

It has long been known to treat high molecular weight, water-soluble substances with dialdehydes. This is described e.g. in U.S. Pat. Nos. 3,072,635, 3,903,076, DE-A2,415,556 and DE-A-2,535,311.

The surface treatment of pulverulent hydrocolloids with dialdehydes particularly glyoxal, renders the hydrocolloids temporarily hydrophobic so that they can be dispersed in aqueous systems without forming lumps. The particles completely dissolve after some time. This is due to the instability of the hemiacetal present when relatively small quantities of glyoxal are used. The process of solution may be accelerated by the addition of alkalies.

Such aqueous systems have no significant viscosity until cross-linking has been eliminated. This is regarded as a disadvantage for some purposes.

Cellulose ether mixtures which can be dispersed in water without forming lumps are disclosed in U.S. Pat. No. 4,373,959. In the process described there, cellulose ethers which are uncross-linked and glyoxal-cross-linked cellulose ethers are mixed in the dry state. The proportion of uncross-linked cellulose ether is, however, generally less than 30% by weight, in particular less than 20% by weight, because lumps and agglomerations are otherwise obtained, as described in column 6, lines 8 et seq.

It is an object of the present invention to provide an improved process for the preparation of hydrocolloid mixtures which is free from the disadvantages mentioned above.

The invention relates to a process for the preparation of water-dispersible hydrocolloid mixtures of at least one uncross-linked hydrocolloid A and at least one cross-linked hydrocolloid B by mixing A and B, characterised in that at least one of the hydrocolloids is exposed to at least one swelling agent or solvent M for the hydrocolloid in a mixing apparatus and vigorously mixed and the agent M is optionally subsequently evaporated off.

The mixtures according to the invention can be dispersed in aqueous systems without the formation of lumps. The swelling agent or solvent may be added either to a previously prepared mixture or to one of the two components. In the latter case, the second component is added, preferably as a dry substance, after the agent has been left to act for some time on the first component. The swelling agent or solvent may act first on the cross-linked hydrocolloid or first on the uncross-linked hydrocolloid.

Hydrocolloids are understood in the context of the present invention to be polymers which are water-soluble or become water-soluble after the elimination of cross-linking. Polysaccharides are preferred hydrocolloids. The following are particularly preferred hydrocolloids: Non-ionic cellulose ethers such as methyl cellulose: hydroxyalkylcelluloses such as hydroxyethylcellulose, hydroxypropylcellulose and hydroxyethylhydroxypropylcellulose; hydroxyalkylmethylcelluloses such as hydroxypropylmethylcellulose and hydroxyethylmethylcellulose: hydroxyalkylcelluloses carrying an ionic substituent, such as dialkylaminoalkyl- hydroxypropyl cellulose and carboxyalkylhydroxyalkylcellulose: water-soluble salts of cellulosehydroxycarboxylic acids, such as the sodium salt of carboxymethylcellulose; natural polysaccharides such as xanthane, and modified starches such as hydroxypropyl starch.

The uncross-linked polysaccharide components used are preferably xanthane and the water-soluble cellulose ethers, methylhydroxyethylcellulose, methylhydroxypropylcellulose and carboxymethylcellulose, methylhydroxyethylcellulose and carboxymethylcellulose being particularly preferred. The cross-linked components used are preferably the cellulose ethers, methylhydroxyethylcellulose and methylhydroxypropylcellulose. The water-soluble cellulose ethers are cross-linked with dialdehydes by known methods, preferably with glyoxal.

The swelling agents and solvents are compounds which either cause swelling of the hydrocolloids or in which the hydrocolloids are soluble.

80% Methanol, 80% ethanol, and water are preferred swelling agents or solvents, especially water. The swelling agent or solvent is preferably used in a quantity of from 10 to 40% by weight, most preferably in a quantity of from 15 to 25% by weight, based on the total quantity of hydrocolloids present in the mixture.

The subjection of the hydrocolloids to the swelling agent or solvent M and vigorous mixing of the hydrocolloids with the agent M must ensure intensive intermingling of the agent M with the hydrocolloid. Apparatus particularly suitable for this purpose are, for example, kneaders, mixers for wet products, granulating drums and pelleting plates.

The agent M may for example, be added to only one hydrocolloid separately or to all the hydrocolloids before they are mixed together or to the mixture of hydrocolloids and is in each case added before the mixture is dispersed.

The dwell time in the mixing apparatus depends on the swelling agent or solvent and on the kneading forces produced in the apparatus employed. A dwell time of from 15 to 120 minutes is preferred, especially from 30 to 60 minutes.

The process described may be used to prepare mixtures containing up to 40% of uncross-linked hydrocolloids, mixtures containing from 25 to 35% of uncross-linked hydrocolloid being particularly preferred.

The invention further relates to improved aqueous hydrocolloid mixtures containing substantially one uncross-linked hydrocolloid A and one cross-linked hydrocolloid B and having improved dispersibility in water, characterised in that the initial viscosity amounts to 5 to 15% of the final viscosity. This initial viscosity is developed within 20 minutes by the uncross-linked hydrocolloid A without the addition of basic substances for eliminating the cross-linking of hydrocolloid B.

The final viscosity measured with a Haake Rotovisko at a concentration of 2% at 20° C. and a shearing gradient of 2.55 sec$^{-1}$ in measuring system MVII may amount to 1000–50.000 mPas.

Such hydrocolloid mixtures according to the invention are preferably obtained by the process according to the invention.

The polysaccharide compositions prepared by the process may in addition contain wetting agents, stabilizers, preservatives or the like. They may be used in building materials and paints, as adhesives and in the ceramics industry.

EXAMPLES

The substances used in the Examples are characterised as follows:

Glyoxal-cross-linked methylhydroxyethylcellulose (=MHEC-PV)

A methylhydroxyethylcellulose having the following data is used as starting material:
Degree of substitution:
    DS 1.8–1.9%
    MS 0.4–0.5
Viscosity Haake Rotovisko: 2% solution: 28,000–36,000 mPas This cellulose is found to have a delay time of 30–50 minutes due to the glyoxal.

Carboxymethylcellulose (CMC)

The carboxymethylcellulose is characterised by the following data:
Degree of substitution: 0.65–0.95
Viscosity Haake Rotovisko: 2% solution, 28,000–35,000 mPas Xanthane The xanthane is characterised by the following data:
Viscosity Haake Rotovisko: 1% D=40 sec$^{-1}$: 10,000 mPas

EXAMPLE 1 (INVENTION)

A cellulose ether mixture of 70% of glyoxal-cross-linked methylhydroxyethylcellulose and 30% of uncross-linked carboxymethylcellulose is sprayed with 30% by weight of 80% methanol in a continuously running kneader. This material is kneaded for 60 minutes and then dried to a residual moisture content of 5 to 7% at 105° C. The cellulose ether mixture thus prepared can be dispersed in water without forming lumps.

COMPARISON EXAMPLE

The same cellulose ether mixture as in Example 1 is kneaded dry in a kneader for 60 minutes. When the sample was introduced into water, it formed lumps.

EXAMPLES 2 to 6 (INVENTION)

Glyoxal-cross-linked methylhydroxyethylcellulose together with various uncross-linked polysaccharides is treated with various swelling agents or solvents in a kneader. After a kneading time of 60 to 45 minutes, the mixture is dried to a residual moisture content of 5 to 7%. The various data are entered in the following Table 1. A sample placed on water became wet through and could subsequently be dispersed without forming lumps by light stirring with a glass rod.

TABLE 1

| Example | Mixture | Mixing ratio [% by weight] | Kneading time [min] | Swelling agent or solvent |
|---|---|---|---|---|
| 2 | MHEC-PV CMC-P | 70:30 | 60 | Ethanol, 30% by weight |
| 3 | MHEC-PV CMC-P | 60:40 | 60 | Methanol, 30% by weight |
| 4 | MHEC-PV MHEC-P | 70:30 | 60 | Methanol, 25% by weight |
| 5 | MHEC-PV Xanthane-P | 70:30 | 60 | Methanol, 25% by weight |
| 6 | MHEC-PV CMC-P | 70:30 | 45 | Water, 15% by weight |

PV = Powder, cross-linked
P = Powder

We claim:
1. A process for the preparation of hydrocolloid mixtures dispersible in water from at least one uncross-linked hydrocolloid A and at least one cross-linked hydrocolloid B by mixing A and B, characterized in that at least one of the hydrocolloids is subjected to at least one swelling agent or solvent M for the hydrocolloid in a mixing apparatus and vigorously mixed therewith and the agent M is optionally subsequently drawn off, wherein the uncross-linked hydrocolloid is present in at least about 30% by weight, and wherein the hydrocolloid mixture comprises cross-linked methylhydroxyethylcellulose and uncross-linked methylhydroxyethylcellulose and uncross-linked carboxymethylcellulose.

2. Process according to claim 1, characterised in that the swelling agents or solvents M used are alcohols or water.

3. Process according to claim 1, characterised in that the concentration of swelling agent or solvent M, based on all the hydrocolloids in the hydrocolloid mixture, is from 10 to 30% by weight.

4. Process according to claim 1, characterised in that the cross-linked hydrocolloids B are cross-linked with glyoxal.

5. A building material, paint or adhesive containing water and a hydrocolloid mixture comprising at least one uncross-linked hydrocolloid A and at least one cross-linked hydrocolloid B, at least one of the hydrocolloids having been subjected to at least one swelling agent or solvent M for the hydrocolloid in a mixing apparatus and vigorously mixed therewith and the agent M having been optionally subsequently drawn off, wherein the uncross-linked hydrocolloid is present in at least about 30% by weight, and wherein the hydrocolloid mixture comprises cross-linked methylhydroxyethylcellulose and uncross-linked methylhydroxyethylcellulose and uncross-linked carboxymethylcellulose.

6. A building material, paint or adhesive according to claim 5, characterized in that the swelling agents or solvent M used are alcohols or water.

7. A building material, paint of adhesive according to claim 5, characterized in that the concentration of swelling agent or solvent M, based on all the hydrocolloids in the hydrocolloid mixture, is from 10 to 30% by weight.

8. A building material, paint or adhesive according to claim 5, characterized in that the cross-linked hydrocolloids B are cross-linked with glyoxal.

* * * * *